(12) United States Patent
Balakrishnan et al.

(10) Patent No.: US 9,946,552 B2
(45) Date of Patent: Apr. 17, 2018

(54) SYSTEM AND METHOD FOR DETECTING REDUNDANT ARRAY OF INDEPENDENT DISKS (RAID) CONTROLLER STATE FROM BASEBOARD MANAGEMENT CONTROLLER (BMC)

(71) Applicant: American Megatrends, Inc., Norcross, GA (US)

(72) Inventors: Venkatesan Balakrishnan, Chennai (IN); J. Vinodhini, Chennai (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 73 days.

(21) Appl. No.: 15/271,498

(22) Filed: Sep. 21, 2016

(65) Prior Publication Data

US 2018/0081550 A1 Mar. 22, 2018

(51) Int. Cl.
*G06F 9/44* (2018.01)
*G06F 3/06* (2006.01)

(52) U.S. Cl.
CPC .......... *G06F 9/4406* (2013.01); *G06F 3/0632* (2013.01); *G06F 3/0689* (2013.01)

(58) Field of Classification Search
CPC ..... G06F 9/4406; G06F 3/0632; G06F 3/0689
See application file for complete search history.

(56) References Cited

U.S. PATENT DOCUMENTS

| 6,249,831 | B1 * | 6/2001 | Allingham | G06F 3/061 710/312 |
| 9,632,702 | B2 * | 4/2017 | Song | G06F 3/0607 |
| 9,697,062 | B2 * | 7/2017 | Fujimori | G06F 11/0706 |
| 2015/0169221 | A1 * | 6/2015 | Shirasu | G06F 3/0685 711/163 |

* cited by examiner

*Primary Examiner* — Stefan Stoynov
(74) *Attorney, Agent, or Firm* — Locke Lord LLP; Tim Tingkang Xia, Esq.

(57) ABSTRACT

Systems and methods for synchronizing a redundant array of independent disks (RAID) controller with a management controller. The system includes the management controller, a RAID having the RAID controller connected to the management controller; and a serial bus connected to the management controller and the RAID controller. The RAID controller is configured to, when the RAID is powered up, assert the serial bus with a ready signal, and the management controller is configured to, upon checking the ready signal from the serial bus, construct a communication with the RAID controller for communicating with the RAID.

20 Claims, 7 Drawing Sheets

SYSTEM AND METHOD FOR DETECTING REDUNDANT ARRAY OF INDEPENDENT DISKS (RAID) CONTROLLER STATE FROM BASEBOARD MANAGEMENT CONTROLLER (BMC)

FIELD

The present disclosure relates generally to management controller technology, and more particularly to systems and methods for detecting redundant array of independent disks (RAID) controller state from a baseboard management controller (BMC).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

BMC manages storage components of RAID via the RAID controller. Interfacing libraries from different vendors are available to bridge the BMC and the RAID controller. The BMC communicates with the RAID when the host of the BMC is powered on. Even after the host is powered on, the RAID controller still needs some time to initialize itself to be ready for the RAID-BMC communication. So in order to communicate to the RAID, the BMC has to know the current state of the RAID controller. However, the method of checking the current state of the RAID controller is not efficient.

Therefore, an unaddressed need exists in the art to address the aforementioned deficiencies and inadequacies.

SUMMARY

Certain aspects of the present disclosure relate to a system. In certain embodiments, system includes a computing device comprising a basic input/output system (BIOS); a management controller connected to the computing device; a redundant array of independent disks (RAID) having a RAID controller connected to the management controller and the computing device; and a control circuit connected to the BIOS and the management controller. The BIOS is configured to, when the host computing device is powered up and the BIOS completes power-on self-test (POST), send a POST code to the control circuit. The control circuit is configured to, upon receiving the POST code from the BIOS, attribute a first value to the management controller. The management controller is configured to, upon receiving the first value, construct a communication with the RAID controller for communicating with the RAID.

In certain embodiments, the management controller is a baseboard management controller (BMC).

In certain embodiments, the control circuit is a complex programmable logic device (CPLD).

In certain embodiments, the management controller is connected to the control circuit via a general purpose input/output (GPIO) line, and the control circuit is configured to attribute the first value to the management controller through the GPIO line. In certain embodiments, the management controller includes an input pin connected to the GPIO line, and the first value is a high voltage value.

In certain embodiments, the control circuit is further configured to, when detecting a power off of the computing device, attribute a second value to the management controller; and the management controller is configured to, upon receiving the second value, disconnect with the RAID controller.

In certain embodiments, the second value is a low voltage value.

Certain aspects of the present disclosure relate to a system. The system includes a management controller; a redundant array of independent disks (RAID), comprising a RAID controller connected to the management controller; and a serial bus connected to the management controller and the RAID controller. The RAID controller is configured to, when the RAID is powered up, assert an alert signal to the serial bus; the serial bus is configured to, upon configured with the alert signal, send an interrupt to the management controller; and the management controller is configured to, upon receiving the interrupt, construct a communication with the RAID controller for communicating with the RAID.

In certain embodiments, the management controller is a baseboard management controller (BMC).

In certain embodiments, the serial bus is a system management bus (SMBus).

In certain embodiments, the system further includes a computing device connected with the management controller, the RAID controller and the serial bus, and the SMBus is configured to send the interrupt to the management controller via the computing device.

In certain embodiments, the RAID controller is further configured to, when being turned off, send a disconnect message to the management controller; and the management controller is configured to, upon receiving the disconnect message, disconnect with the RAID controller.

In certain embodiments, the management controller is further configured to, after being disconnected from the RAID controller, wait for another interrupt from the serial bus.

Certain aspects of the present disclosure relate to a system. The system includes a management controller; a redundant array of independent disks (RAID), comprising a RAID controller connected to the management controller, where the RAID controller includes a special pin; and a serial bus connected to the management controller and the special pin of the RAID controller. The RAID controller is configured to, when the RAID is powered up, assert the special pin with a ready signal; and the management controller is configured to, upon checking the ready signal from the special pin via the serial bus, construct a communication with the RAID controller for communicating with the RAID.

In certain embodiments, the management controller is a baseboard management controller (BMC).

In certain embodiments, the management controller is configured to check the ready signal from the special pin of the RAID controller via the serial bus when the management controller attempts to communicate with the RAID controller.

In certain embodiments, the serial bus is an inter-integrated circuit (I2C) bus.

In certain embodiments, the special pin is a RAID_Ready pin, and the RAID controller asserts the ready signal by providing a high voltage value to the special pin.

In certain embodiments, the RAID controller is further configured to withdraw the ready signal from the serial bus; and the management controller is configured to, upon checking a withdrawn of the ready signal of the serial bus, disconnect with the RAID controller.

In certain embodiments, the management controller is further configured to, after being disconnected from the RAID controller, check the serial bus for the ready signal.

Certain aspects of the present disclosure relate to a method for synchronizing the management controller and the RAID controller, using the system described above.

Certain aspects of the present disclosure relate to a non-transitory computer readable medium storing computer executable code. In certain embodiments, the computer executable code, when executed, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
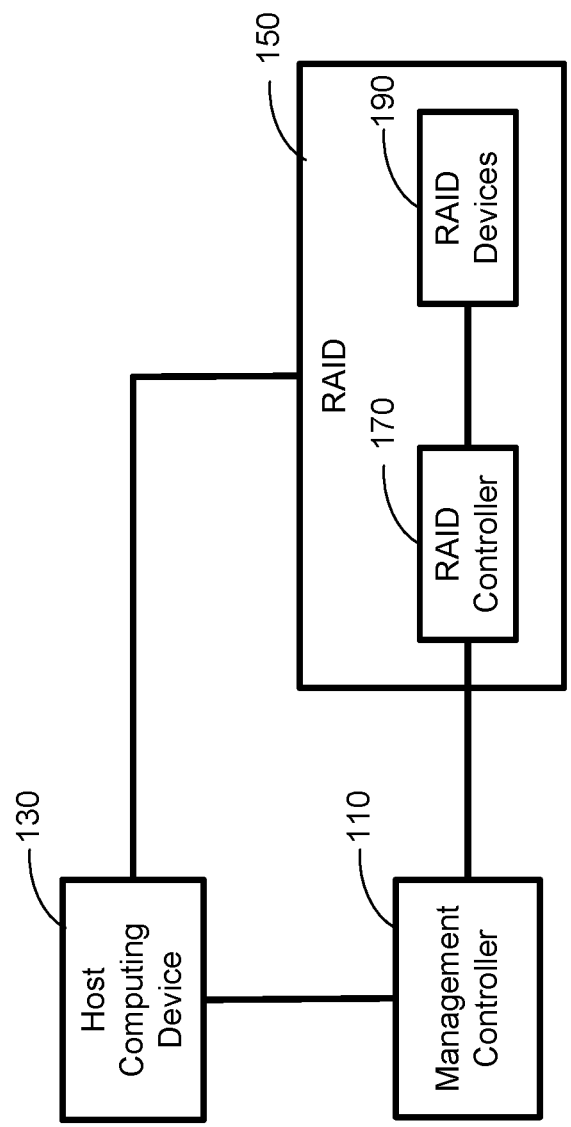
FIG. 1 schematically depicts a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor.

In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refers to a hardware electronic component, and may refer to or include a small electronic circuit unit, also known as an integrated circuit (IC), or a combination of electronic circuits or ICs.

The term "baseboard management controller" or its abbreviation "BMC" is the intelligence in the IPMI architecture. It is a specialized microcontroller embedded on the motherboard of a computer, which manages the interface between the system management software and the platform hardware.

The term "redundant array of independent disks" or "redundant array of inexpensive disks" or its abbreviation "RAID" is a data storage virtualization technology that combines multiple physical disk drive components into a single logical unit for the purposes of data redundancy, performance improvement, or both. Data is distributed across the drives in one of several ways, referred to as RAID levels, depending on the required level of redundancy and performance. An inexpensive RAID controller is a standard drive controller chip with proprietary firmware and drivers to communicate with the BMC and control the RAID.

The term "basic input/output system" or its abbreviation "BIOS", also known as the System BIOS, ROM BIOS or PC BIOS) is a type of firmware used to perform hardware initialization during the booting process (power-on startup) on IBM PC compatible computers, and to provide runtime services for operating systems and programs. The BIOS firmware is built into personal computers (PCs), and it is the first software they run when powered on.

The term "power-on self-test" or its abbreviation "POST" is a process performed by firmware or software routines immediately after a computer or other digital electronic device is powered on. In the case of a computer, the POST routines are part of a device's pre-boot sequence and only once they complete successfully is the bootstrap loader code invoked to load an operating system.

The term "complex programmable logic device" or its abbreviation "CPLD" is a programmable logic device with complexity between that of programmable array logics (PALs) and field-programmable gate arrays (FPGAs), and architectural features of both. A CPLD is a combination of a fully programmable AND/OR array and a bank of macrocells. The AND/OR array is reprogrammable and can perform a multitude of logic functions. Macrocells are functional blocks that perform combinatorial or sequential logic, and also have the added flexibility for true or complement, along with varied feedback paths.

The term "serial communication," in telecommunication and computer science, is the process of sending data one bit at a time, sequentially, over a communication channel or computer bus. This is in contrast to parallel communication, where several bits are sent as a whole, on a link with several parallel channels.

The term "inter-integrated circuit" or its abbreviation "I²C", is a multi-master, multi-slave, single-ended, serial computer bus that allows easy communication between components residing on the same circuit board. It is typically used for attaching lower-speed peripheral ICs to processors and microcontrollers in short-distance, intra-board communication.

The term "system management bus" or its abbreviation "SMBus" or "SMB" is a single-ended simple two-wire bus for the purpose of lightweight communication. Most commonly it is found in computer motherboards for communication with the power source for ON/OFF instructions. It is derived from I²C for communication with low-bandwidth devices on a motherboard, especially power related chips such as a laptop's rechargeable battery subsystem. Other devices might include temperature, fan or voltage sensors, lid switches and clock chips.

The term "general-purpose input/output" or its abbreviation "GPIO" is a generic pin on an integrated circuit whose behavior—including whether it is an input or output pin—is controllable by the user at run time. GPIO pins have no predefined purpose, and go unused by default. The idea is that sometimes a system integrator who is building a full system might need a handful of additional digital control lines-and having these available from a chip avoids having to arrange additional circuitry to provide them.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

A management controller, such as a BMC, manages storage components RAID via the RAID controller. Interfacing libraries from different vendors are available to bridge the BMC and the RAID controller. BMC communicates with RAID when the host computing device is powered on. Even after the host computing device is powered on, the RAID controller still need some time to initialize itself to be ready for the RAID-BMC communication. So, in order to communicate to RAID, BMC has to know the current state of the RAID controller.

Accordingly, in one aspect of the present disclosure, the state of the RAID controller may be known by BMC polling. For example, the BMC can start polling for RAID controller status and when the RAID controller is available, the BMC can communicate with the RAID controller for further information. In this embodiment, BMC polling is there to know if the RAID controller is ready or not.

In another aspect of the present disclosure, state of the RAID controller can be known by delay interval. After the host computing device is powered on, a delay interval can be given and then BMC can communicate with RAID through the RAID controller after that delay interval. This has its own pros and cons. The delay time may be given only based on the platform and the connected storage components RAID. The interval cannot be made generic.

In a further aspect of the present disclosure, BIOS POST completion is considered as RAID control ready state. The BMC may know the POST completion via BIOS POST code, and subsequently construct communication with the RAID controller. In other words, POST completion is used to synchronize the BMC and the RAID controller. In accordance with the above described purposes of the present disclosure, as embodied and broadly described herein, in certain aspects, the present disclosure relates to a system having a management controller, such as a baseboard management controller (BMC).

FIG. 1 schematically depicts a system according to certain embodiments of the present disclosure. As shown in FIG. 1, the system 100 includes a management controller 110, a host computing device 130, and a RAID 150 communicatively connected with the management controller 110 and the host computing device 130. The RAID 150 includes a RAID controller 170 and one or more RAID devices 190, and the RAID controller 170 controls the management of the RAID devices 190. In certain embodiments, the management controller 110 is a BMC, which is communicatively connected to the host computing device 130 through a system interface (not shown). In certain embodiments, the RAID 150 is connected to the management controller 110 via an interface (not shown). In certain embodiments, the system 100 is a server of a client-server system. In certain embodiments, the RAID 150 may be devices or components located in the host computing device 130. In certain embodiments, the RAID controller is in the form of a peripheral component interconnect (PCI) or PCI Express (PCIe), which is designed to support a specific drive format such as serial AT attachment (SATA) or small computer system interface (SCSI). In certain embodiments, the RAID controller may be integrated with the motherboard of the host computing device 130. In certain embodiments, the RAID controller may also be software-only, using the hardware resources of the host computing device 130.

The management controller 110 is a specialized microcontroller that manages the interface between system management software and platform hardware. In certain embodiments, the management controller 110 may be a BMC or a service processor (SP). Different types of sensors can be built into the host computing device 130, and the management controller 110 reads these sensors to obtain parameters such as temperature, cooling fan speeds, power status, OS status, etc.

Figure 2:
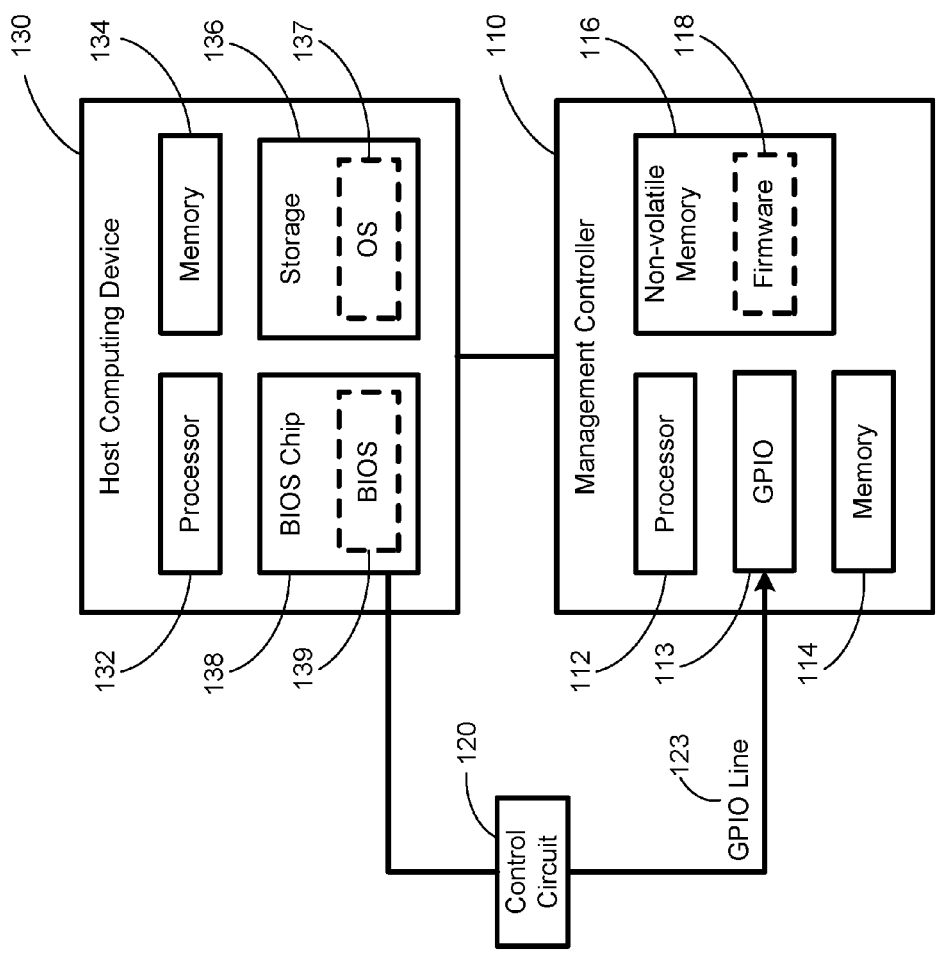
FIG. 2 schematically depicts a configuration for synchronizing the management controller with RAID according to certain embodiments of the present disclosure.

FIG. 2 schematically depicts a configuration for synchronizing the management controller with the RAID according to certain embodiments of the present disclosure. In the embodiments, a control circuit 120 is provided to communicate the host computing device 130 with the management controller 110. In certain embodiments, the control circuit 120 is a complex programmable logic device (CPLD). In certain embodiments, the management controller 110 is a BMC. As shown in FIG. 2, the management controller 110 includes a processor 112, a general-purpose input/output (GPIO) 113, a memory 114, and a non-volatile memory 116. In certain embodiments, the management controller 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 112 controls operation of the management controller 110. In certain embodiments, the processor 112 may be a central processing unit (CPU). The processor 112 may execute any computer executable code or instructions, such as a firmware 118 or other codes stored in the management controller 110. In certain embodiments, the management controller 110 may run on or more than one processor, such as two processors, four processors, eight processors, or any suitable number of processors.

The GPIO 113 is a generic pin electrically connected to the control circuit 120, for indicating status of POST completion of the BIOS 139. In certain embodiments, the GPIO 113 is configured as an input pin, and the GPIO 113 is asserted with a first input value or a second input value by the control circuit 120. The first input value may indicate POST complete of the BIOS 139, and the second input value may indicate power off detected by the control circuit 120. In certain embodiments, the first input value may be a high voltage value greater than a first threshold voltage, and the second input value may be a low voltage value less than a second threshold voltage. In one example, the first threshold voltage may be about 2 volt or about 5 volt, the second threshold voltage may be 0 volt. For example, when the BIOS 139 complete the POST process, the BIOS 139 sends a post code to the control circuit 120. The control circuit 120 processes the post code, and in response to receiving the POST code, the control circuit 120 configures the high input value (i.e., the logical "1" signal) to the GPIO 113 via the GPIO line 123, and then the management controller 110 reads or receives the high input value from the GPIO 113. Upon reading the high input value from the GPIO 113, the management controller 110 in response constructs a communication with the RAID controller 170. Further, the control circuit 120 is configured to detect power off of the host computing device 130, for example the power off of the BIOS 139. When the control circuit 120 detects the power off, the control circuit 120 configures the low input value (i.e., the logical "0" signal) to the GPIO 113 via the GPIO line 123. Upon reading the low input value from the GPIO 113, the management controller 110 disconnects itself from the RAID controller 170. After disconnection, the management controller 110 may need to refer to wait the GPIO 113 before re-connecting the RAID controller 170. For example, the management controller 110 may read the GPIO 113 regularly to check the status of the GPIO 113, and reconstruct connection with the RAID controller 170 when the GPIO 113 has the high input value. In certain embodiments, a sensor may be mapped to the GPIO 113. For example, the sensor may be disposed to the BIOS 139 to check the POST completion state of the BIOS 139, and the GPIO 113 is able to reflect the status of the sensor.

The memory 114 may be a volatile memory, such as the random-access memory (RAM), for storing the data and information during the operation of the management controller 110. In certain embodiments, the memory 114 may be a volatile memory array. In certain embodiments, the management controller 110 may run on more than one memory 114.

The non-volatile memory 116 is a non-volatile data storage media or device for storing the computer executable code of the management controller 110. Examples of the non-volatile memory 116 may include flash memory, memory cards, USB drives, or other types of non-volatile storage devices such as hard drives, floppy disks, optical drives, or any other types of data storage devices. In certain embodiments, the management controller 110 may have more than one non-volatile memory 116, and the firmware 118 and other applications of the management controller 110 may be stored in the more than one non-volatile memory 116 separately.

As shown in FIG. 2, the non-volatile memory 116 stores the firmware 118 of the management controller 110. The firmware 118 of the management controller 110 includes computer executable codes for performing the operation of the management controller 110. In certain embodiments, the computer executable code or instructions may collectively form the firmware 118. In certain embodiments, the firmware 118 is configured to, when being executed by the processor 112 in the memory 114, read input value from the GPIO 113, and construct communication with the RAID controller 170 in response to the high input value and disconnect from the RAID controller 170 in response to the low input value. In certain embodiments, the firmware 118, when being executed, is configured to read the GPIO 113 regularly when the management controller 110 is disconnected from the RAID controller 170. In certain embodiments, the firmware 118, when being executed, may also be configured to construct communication with the RAID controller 170 in response to the low input value and disconnect from the RAID controller 170 in response to the high input value.

The control circuit 120 is provided for communicating the host computing device 130 with the management controller 110. Specifically, the control circuit 120 is communicatively connected to the BIOS 139 of the host computing device 130 and the GPIO 113 of the management controller 110. When POST of BIOS 139 is complete, the BIOS 139 sends the post code the control circuit 120. The control circuit 120, upon receiving the post code indicating that the POST is completed, configures the high input value to assert the GPIO 113 via the GPIO line 123. When the host computing device 130 is powered off, the control circuit 120 is able to detect the power off, and configures the low input value to de-assert the GPIO 113 via the GPIO line 123. In certain embodiments, the control circuit 120 is a complex programmable logic device (CPLD).

The host computing device 130 is a host computer of the management controller 110. In certain embodiments, the host computing device 130 may be a general purpose computer, a specialized computer, a server, or any other types of computing device. In certain embodiments, one or more of the RAID 150 may be a part of the host computing device 130. As shown in FIG. 2, the host computing device 130 may include, without being limited to, a processor 132, a memory 134, a storage 136, and a BIOS chip 138. In certain embodiments, the host computing device 130 may include other hardware components and software components (not shown) to perform its corresponding tasks. Examples of these hardware and software components may include, but not limited to, other required memory, interfaces, buses, Input/Output (I/O) modules and peripheral devices.

The processor 132 is a host processor which is configured to control operation of the host computing device 130. In certain embodiments, the processor 132 may be a central processing unit (CPU). The processor 132 may execute an operation system (OS) 137 and/or other applications of the host computing device 130. In some embodiments, the host computing device 130 may have more than one CPU as the processor, such as two CPUs, four CPUs, eight CPUs, or any suitable number of CPUs.

The memory 134 may be a volatile memory, such as the random-access memory (RAM), for storing the data and information during the operation of the host computing device 130. In certain embodiments, the host computing device 130 may run on more than one memory 134. In certain embodiments, the memory 134 is in communication with the processor 132 through a system bus (not shown).

The storage device 136 is a data storage media for storing the OS 137 and other applications of the host computing device 130. Examples of the storage device 136 may include non-volatile memory such as flash memory, memory cards, USB drives, hard drives, floppy disks, optical drives, or any other types of data storage devices. In certain embodiments, the host computing device 130 may have multiple storage devices 136, which may be identical storage devices or different types of storage devices, and the applications of the host computing device 130 may be stored in one or more of the storage devices 136 of the host computing device 130.

In certain embodiments, the BIOS chip 138 is a nonvolatile memory, such as a flash memory chip, an electrically erasable programmable read-only memory (EEPROM) chip or a complementary metal oxide semiconductor (CMOS) memory. As shown in FIG. 2, the BIOS chip 138 stores a BIOS image 139 (hereinafter the BIOS 139). The BIOS 139 is an image file storing the firmware codes which, when executed at the CPU 132, are configured to perform the startup functions, or the booting functions, for the host computing device 130. Examples of the booting functions include, but are not limited to, the initiation and power-on self-test, identifying the system devices, locating the boot loader software on the boot device, loading and executing the boot loader software and giving it control of the OS 137 in the protected mode. In certain embodiments, the POST of the BIOS 139 includes: verify CPU registers; verify the integrity of the BIOS code itself; verify some basic components like DMA, timer, interrupt controller; find, size, and verify system main memory; initialize BIOS; pass control to other specialized extension BIOSes (if installed); and identify, organize, and select which devices are available for booting. In certain embodiments, the POST of the BIOS 139 further includes: discover, initialize, and catalog all system buses and devices; provide a user interface for system's configuration; and construct whatever system environment is required by the target operating system.

As described above, when being executed, the BIOS 139 can perform the startup or the booting functions. In the booting process, the BIOS 139 performs a power-on self-test operation, which initializes and identifies the system hardware devices of the host computing device 130, such as the CPU 132, the memory 134, the storage device 136, peripheral I/O devices such as display card, keyboard and mouse, and other hardware devices. In certain embodiments, the BIOS 139 may identify the storage device 136, which stores the OS 137, as a bootable device. Once the BIOS 139 completes the self-test operation, the BIOS 139 then attempts to boot the host computing device 130, i.e., instructs the CPU 132 to read and execute the OS 137 from the bootable device, i.e. the storage device 136 as specified in the BIOS 139. Typically, the BIOS 139 attempts to load a boot loader program from the storage device 136. The boot loader program then loads the OS 137 from the storage device 136. Thus, the CPU 132 can execute the OS 137 and run an instance of the OS 137. At the end of the booting process, the control of the computer system is given to the OS 137.

In certain embodiments, after power up of the host computing device 130 and POST completion of the BIOS 139, the BIOS 139 delivers a POST code to the control circuit 120, and the CPLD 120 subsequently asserts the GPIO 113 of the management controller 110 through the GPIO line 123, such that the management controller 110 constructs the communication with the RAID 150 upon read the assertion of the GPIO 113. The assertion of the GPIO 113 may be achieved by configure the high input value of the GPIO 113 by the control circuit 120.

Figure 3:
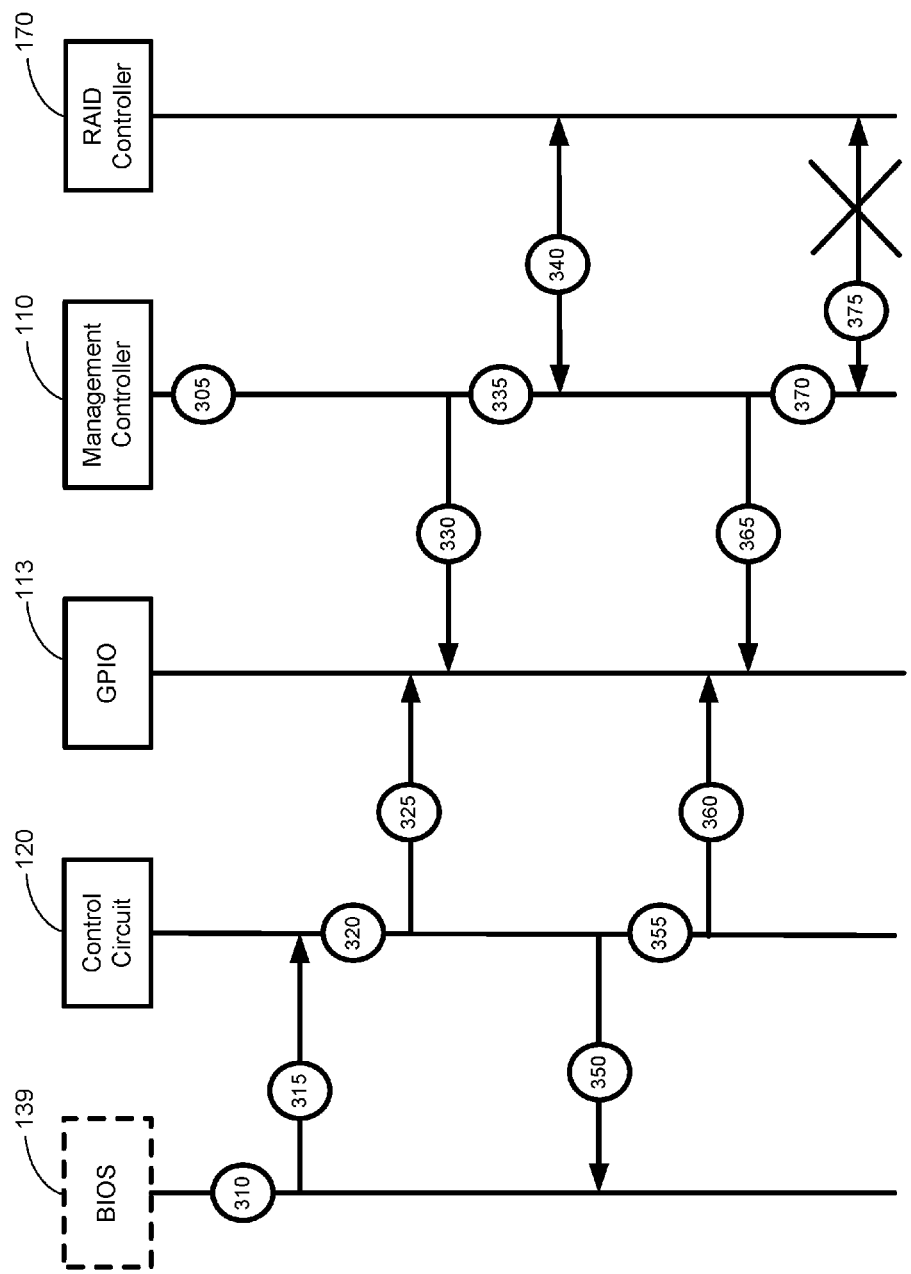
FIG. 3 schematically depicts a process of constructing communication between a management controller and a RAID controller according to certain embodiments of the present disclosure.

FIG. 3 schematically depicts a process of constructing communication between a management controller and a RAID controller using a control circuit according to certain embodiments of the present disclosure. In certain embodiments, the method as shown in FIG. 3 may be implemented on a system as shown in FIGS. 1 and 2. It should be particularly noted that, unless otherwise stated in the present disclosure, the steps of the method may be arranged in a different sequential order, and are thus not limited to the sequential order as shown in FIG. 3.

As shown in FIG. 3, when the system is powered on, the management controller 110 boots up at procedure 305. Then the BIOS 139 of the host computing device 130 boots up at procedure 310. In certain embodiments, the initiation of the booting of the BIOS 139 is after the initiation of the booting of the management controller 110. In certain embodiments, the booting of the BIOS 139 and the booting of the management controller 110 may be at the same time or independent from each other.

At procedure 315, after the BIOS 139 completes power-on self-test (POST), the BIOS 139 sends a POST code to the control circuit 120. The POST code indicates the completion of the POST process. It is noted that when the BIOS 139 completes the POST, the RAID controller 170 is regarded as being ready for communication with the management controller 110. Further, the booting of the BIOS 139 may subsequently trigger the loading of the OS 137.

Upon receiving the POST code from the BIOS 139, at procedure 320, the control circuit 120 processes the POST code, and based on the POST code, at procedure 325, configures a first value to the GPIO 113 via the GPIO line 123. In certain embodiments, the control circuit 120 is a CPLD. In certain embodiments, the GPIO 113 is a input GPIO, and the first value may be a high input value, such as a high voltage value that is greater than a first threshold voltage.

At procedure 330, the management controller 110 reads the GPIO 113 to receive the first input value, and at procedure 335, processes the first input value.

In certain embodiments, the receiving of the first value, such as the high input voltage, triggers the management controller 110 to construct communication with the RAID controller 170 at procedure 340. After the communication between the management controller 110 and the RAID controller 170 is constructed, the management controller 110 is able to communicate data with the RAID 150 via the RAID controller 170, such as reading and writing functions performed to certain RAID device 190. At this time, the management controller 110 may still check the status of the GPIO 113 regularly.

In certain embodiments, when the system is powered off, procedures 350 to 370 may be performed sequentially or in any other suitable order. In certain embodiments, the control circuit 120, the management controller 110, and the RAID controller 170 may include their own battery to support the operation during power off of the system.

The control circuit 120 may detect the power off of the BIOS 139 at procedure 350. In certain embodiments, the control circuit 120 detects continuously or in regular intervals the status of the BIOS 139.

At procedure 355, the control circuit 120 detects the power off of the BIOS 139.

Upon detecting that the BIOS 139 is powered off, at procedure 355, the control circuit 120 processes the detecting result. Based on the process of the detecting result, at procedure 360, the control circuit 120 configures a second value to the GPIO 113 via the GPIO line 123. In certain embodiments, the GPIO 113 is an input GPIO, and the second value may be a low input value, such as a low voltage value that is less than a second threshold voltage. In certain embodiments, the low input value may be a 0 volt voltage.

At procedure 365, the management controller 110 reads the GPIO 113 to receive the second input value, and at procedure 370, process the second input value.

In certain embodiments, the receiving of the second value, such as the low input voltage, triggers the management controller 110 to disconnect from the RAID controller 170 at procedure 375.

After the management controller 110 and the RAID controller 170 is disconnected, the management controller 110 may still check the status of the GPIO 113 regularly, to wait for the connection instruction to construct communication with the RAID controller 170.

Figure 4:
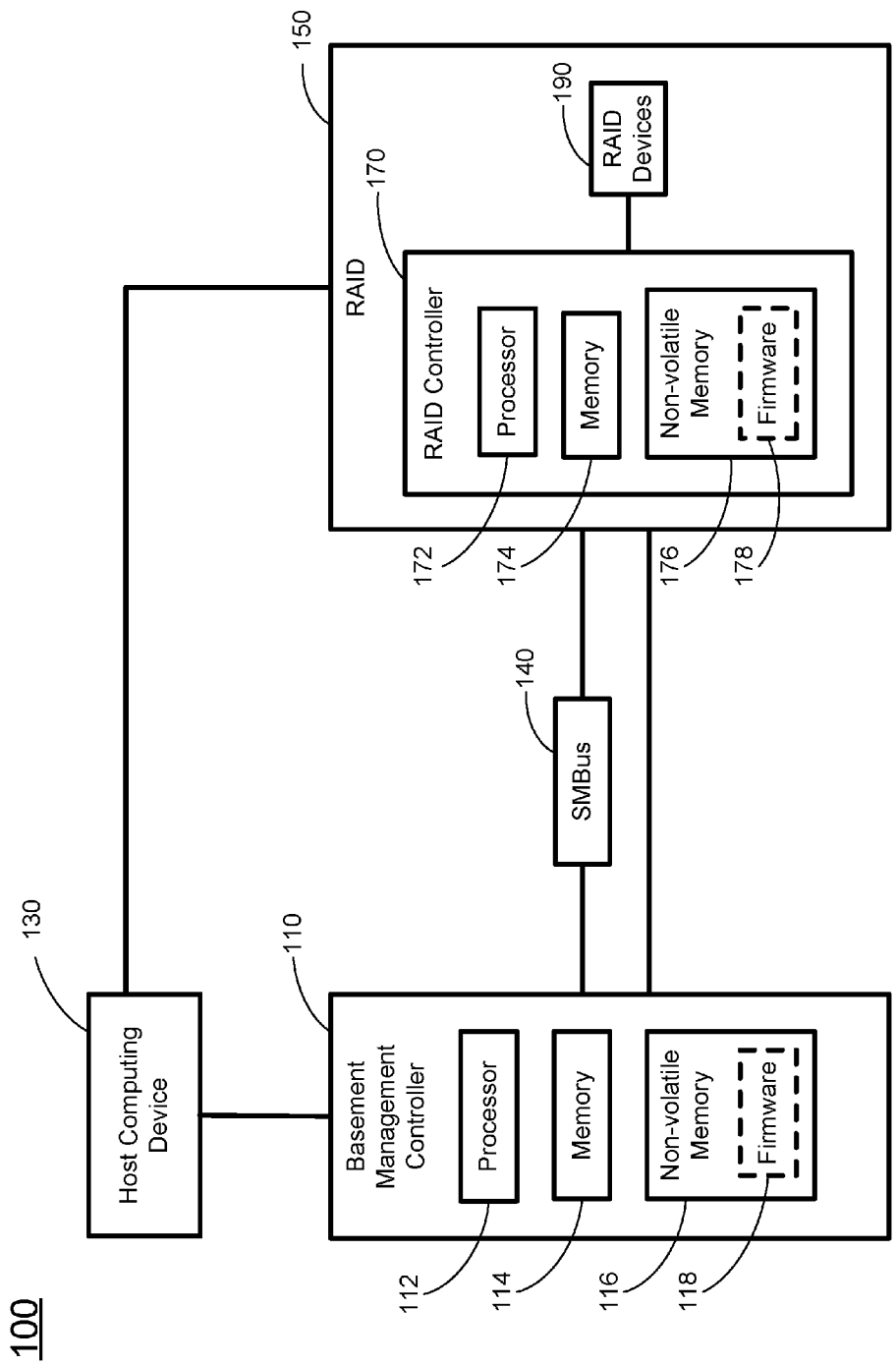
FIG. 4 schematically depicts a configuration for synchronizing the management controller with RAID according to certain embodiments of the present disclosure.

FIG. 4 schematically depicts a configuration for synchronizing the management controller with the RAID according to certain embodiments of the present disclosure. As shown in FIG. 4, a serial bus, such as a system management (SM) bus 140 is communicatively connected to both the management controller 110 and the RAID management controller 170.

As shown in FIG. 4, the management controller 110 includes the processor 112, the memory 114, and the non-volatile memory 116. The non-volatile memory 116 stores the firmware 118. In certain embodiments, the firmware 118 of the management controller 110, when being executed by the processor 112 in the memory 114, is configured to, in response to receiving an interrupt from the SMBus 140, construct communication with the RAID controller 170, so as to manage the one or more RAID devices 190 via the RAID controller 170. Further, the firmware 118 of the management controller 110, when being executed by the processor 112 in the memory 114, is configured to, in response to receiving the disconnect message from the RAID controller 170, disconnect from the RAID controller 170. Furthermore, the firmware 118 of the management controller 110, when being executed by the processor 112 in the memory 114, is configured to wait for another interrupt from the SMBus 140 when the management controller 110 is disconnected from the RAID controller 170.

As shown in FIG. 4, the RAID management controller 170 includes a processor 172, a memory 174, and a non-volatile memory 176. In certain embodiments, the RAID management controller 170 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 172 controls operation of the RAID management controller 170. In certain embodiments, the processor 172 may be a central processing unit (CPU). The processor 172 may execute any computer executable code or instructions, such as a firmware 178 or other codes stored in the RAID management controller 170. In certain embodiments, the management controller 170 may run on or more than one processor, such as two processors, four processors, eight processors, or any suitable number of processors.

The memory 174 may be a volatile memory, such as the random-access memory (RAM), for storing the data and information during the operation of the RAID management controller 170. In certain embodiments, the memory 174 may be a volatile memory array. In certain embodiments, the RAID management controller 170 may run on more than one memory 174.

The non-volatile memory 176 is a non-volatile data storage media or device for storing the computer executable code of the RAID management controller 170. Examples of the non-volatile memory 176 may include flash memory, memory cards, USB drives, or other types of non-volatile storage devices such as hard drives, floppy disks, optical drives, or any other types of data storage devices. In certain embodiments, the RAID management controller 170 may have more than one non-volatile memory 176, and the firmware 178 and other applications of the RAID management controller 170 may be stored in the more than one non-volatile memory 176 separately.

As shown in FIG. 4, the non-volatile memory 176 stores the firmware 178 of the RAID management controller 170. The firmware 178 of the RAID management controller 170 includes computer executable codes for performing the operation of the RAID management controller 170. In certain embodiments, the computer executable code or instructions may collectively form the firmware 178. In certain embodiments, the firmware 178 is configured to, when being executed by the processor 172 in the memory 174, assert an alert signal to the SMBus 140, such that the SMBus 140 subsequently sends an interrupt to the management controller 110, and the management 110 in response constructs communication with the RAID controller 170. In certain embodiments, the firmware 178, when being executed, may further be configured to, in response to turning off of the RAID controller, send a disconnect message to the management controller 110 so as to disconnect the management controller 110 with the RAID controller 170. After that, the management controller 110 may be configured to wait for another interrupt from the SMBus 140.

In certain embodiments, as shown in FIG. 4, the SMBus 140 is provided for communicating between the management controller 110 and the RAID management controller 170. In certain embodiments, the SMBus 140 may be a dedicated serial bus disposed on the motherboard of the host computing device 130. In certain embodiments, the SMBus 140 may be located on the RAID controller 170 and connected with the power of the RAID controller 170. In certain embodiments, the SMBus 140 is configured to, when being asserted by the RAID controller 170 of the alert signal, send the interrupt to the management controller 110.

Figure 5:
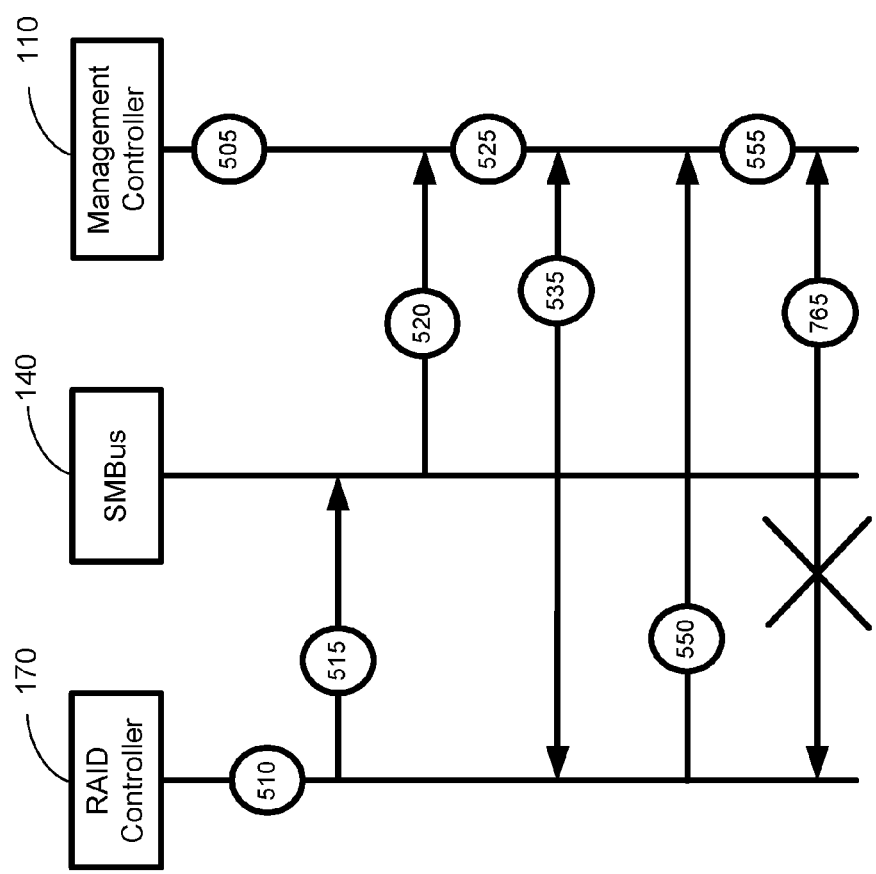
FIG. 5 schematically depicts a process of constructing communication between a management controller and a RAID controller according to certain embodiments of the present disclosure.

FIG. 5 schematically depicts a process of constructing communication between a management controller and a RAID controller according to certain embodiments of the present disclosure. In certain embodiments, the method as shown in FIG. 5 may be implemented on a system as shown in FIGS. 1 and 4. It should be particularly noted that, unless otherwise stated in the present disclosure, the steps of the method may be arranged in a different sequential order, and are thus not limited to the sequential order as shown in FIG. 5.

As shown in FIG. 5, when the system is powered on, the management controller 110 boots up at procedure 505. Then the BIOS 139 of the host computing device 130 boots up, and the OS 137 boots up. During or after the booting up of the host computing device 130, at procedure 510, the RAID controller 170 gets ready.

At procedure 515, after the RAID controller 170 gets ready, the RAID controller 170 sends an alert signal to the SMBus 140, for example, asserts an SM ALERT signal to the SMBus 140. In certain embodiments, the assertion by the RAID controller 170 is performed by sending a signal to the ALERT line of the SMBus 140.

In response to the assertion of the alert signal, at procedure 520, the SMBus 140 sends an interrupt to the management controller 110. Specifically, the ALERT line of the SMBus 140 may act as an interrupt to the processor 112 of the management controller 110. In other embodiments, the ALERT line of the SMBus 140 may sends the interrupt to the processor 132 of the host computing device 130, and in response to receiving the interrupt instruction from the SMBus 140, the processor 132 issues an alert response or an interrupt signal to the management controller 110.

Upon receiving the interrupt signal from the SMBus 140, at procedure 525, the management controller 110 processes the interrupt signal, and at procedure 535, constructs communication with the RAID controller 170 according to the interrupt signal.

In certain embodiments, when the RAID controller 170 is turned off, for example, the host computing device 130 is power off, at procedure 550, the RAID controller 170 sends a disconnect message to the management controller 110. The disconnect message may be sent via the interface between the RAID controller 170 and the management controller 110, or via the SMBus 140.

Upon receiving the disconnect message from the RAID controller 170, at procedure 555, the management controller 110 processes the disconnect message, and in response, at procedure 560, disconnects from the RAID controller 170 based on the disconnect message.

After the disconnection, the management controller 110 will wait for the interrupt signal from the SMBus 140.

Figure 6:
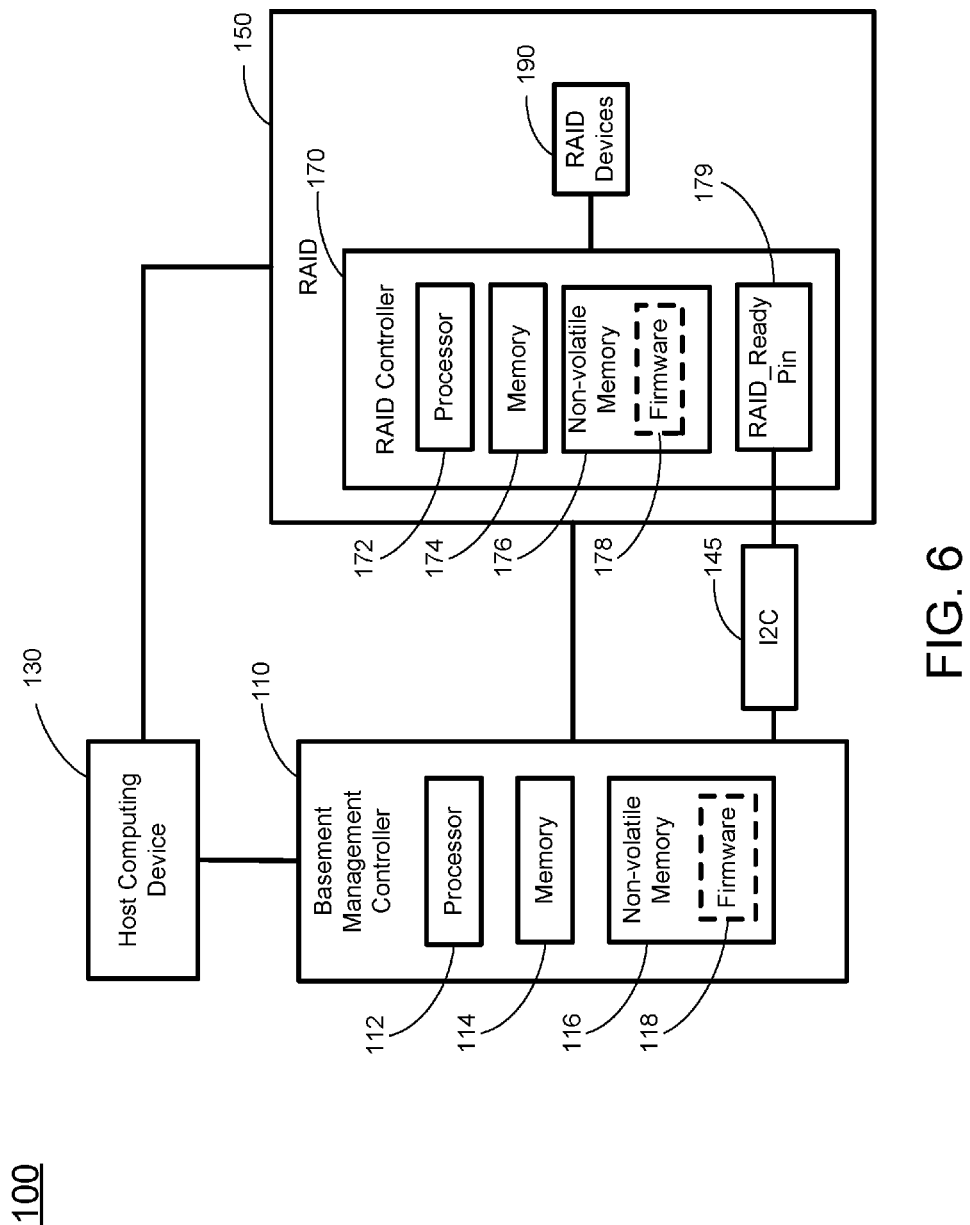
FIG. 6 schematically depicts a configuration for synchronizing the management controller with RAID according to certain embodiments of the present disclosure.

FIG. 6 schematically depicts a configuration for synchronizing the management controller with the RAID according to certain embodiments of the present disclosure. As shown in FIG. 6, the management controller 110 is communicatively connected to a special RAID_Ready pin 179 of the RAID management controller 170 via a serial bus. As shown in FIG. 6, the management controller 110 includes the processor 112, the memory 114, and the non-volatile memory 116 as described above, and the RAID management controller 170 includes the processor 172, the memory 174, and the non-volatile memory 176 as described above.

In certain embodiments, the system 100 further provides a serial bus, such as an inter-integrated circuit (I2C) 145. In certain embodiments, the I2C line 179 is connected to the RAID controller 170 by the special RAID_Ready pin 179, and the RAID controller 170 is able to configure the RAID_Ready pin 179 to indicate if the RAID controller is ready for communication. When the host computing device 130 is powered up and the RAID controller 170 is ready to communicate, the RAID controller 170 asserts the RAID_Ready pin 179. The management controller 110 checks the RAID_Ready pin via the I2C 145 before it starts any communication with the RAID controller 170. In other words, the management controller 110 checks the RAID_Ready pin via the I2C 145 when the management controller 110 attempts to communicate with the RAID controller 170. When the management controller 110 checks and confirms that the RAID_Ready pin 179 is asserted, the management controller 110 then constructs the communication with the RAID controller 170.

When the RAID controller 170 has to perform important internal activity, the RAID controller 170 withdrawn the RAID_Ready pin, such that the management controller 110 disconnects with the RAID controller 170 accordingly. At this stage, the management controller 110 waits for the reconnection with the RAID controller 170 based on the change of status of the RAID_Ready pin 179.

Using this method, the communication between the management controller 110 and the RAID controller 170 can be done through I2C itself and no SMBus is required.

Figure 7:
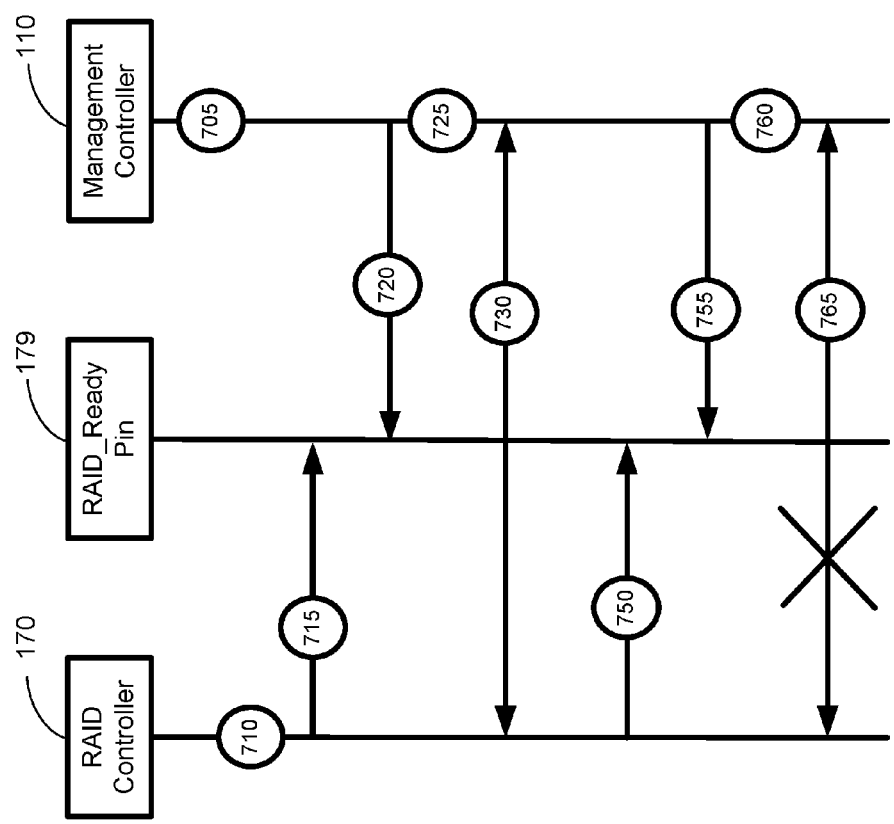
FIG. 7 schematically depicts a process of constructing communication between a management controller and a RAID controller according to certain embodiments of the present disclosure.

FIG. 7 schematically depicts a process of constructing communication between a management controller and a RAID controller according to certain embodiments of the present disclosure. In certain embodiments, the method as shown in FIG. 7 may be implemented on a system as shown in FIGS. 1 and 6. It should be particularly noted that, unless otherwise stated in the present disclosure, the steps of the method may be arranged in a different sequential order, and are thus not limited to the sequential order as shown in FIG. 7.

As shown in FIG. 7, when the system is powered on, the management controller 110 boots up at procedure 705. Then the BIOS 139 of the host computing device 130 boots up, and the OS 137 boots up. As shown in FIG. 7, during or after the booting up of the host computing device 130, at procedure 710, the RAID controller 170 gets ready.

At procedure 715, after the RAID controller 170 gets ready, the RAID controller 170 sends a ready signal to the RAID_Ready pin 179, for example, asserts the RAID_Ready pin 179. In certain embodiments, the assertion of the RAID_Ready pin 179 by the RAID controller 170 is performed by set a third value to the RAID_Ready pin 179. In certain embodiment, the third value is a high voltage value that is greater than a high threshold voltage.

After assertion of the RAID_Ready pin 179, at procedure 720, the management controller 110 checks the status of the RAID_Ready pin 179 via the I2C bus 145 before it starts any communication with the RAID controller 170. In certain embodiments, the management controller 110 checks the status of the RAID_Ready pin 179 regularly soon after the management controller 110 is boot up. In certain embodiments, the management controller 110 checks the voltage of the RAID_Ready pin 179.

Upon receiving the third value of the RAID_Ready pin 179, the management controller 110, at procedure 725, processes the third value, and at procedure 730, constructs communication with the RAID controller 170 according to the third value.

In certain embodiments, when the RAID controller 170 is turned off, or the RAID controller 170 has to perform important internal activity, at procedure 750, the RAID controller 170 may withdraw the RAID_Ready pin 179, for example, by assigning the RAID_Ready pin 179 a fourth value. The fourth value may be a low voltage value less than a low threshold value or a zero voltage value. In other words, the RAID controller 170 de-asserts the RAID_Ready pin 179.

After de-assertion of the RAID_Ready pin 179, at procedure 755, the management controller 110 checks the status of the RAID_Ready pin 179. In certain embodiments, the management controller 110 checks the status of the RAID_Ready pin 179 regularly soon after the management controller 110 is boot up. In certain embodiments, the management controller 110 checks the voltage of the RAID_Ready pin 179.

Upon receiving the fourth value of the RAID_Ready pin 179, the management controller 110, at procedure 760, processes the fourth value, and at procedure 765, disconnect the RAID controller 170 according to the fourth voltage.

After disconnecting from the RAID controller 170, the management controller 110 may wait for the re-connect signal by checking the status of the RAID_Ready pin 179 regularly.

In another aspect, the present disclosure relates to a non-transitory computer readable medium storing computer executable code. In certain embodiments, the computer executable code may be the firmware 118 stored in the non-volatile memory 116, or a firmware 178 stored in the non-volatile memory 176 as described above. The computer executable code, when being executed, may perform one of the methods described above. In certain embodiments, the non-transitory computer readable medium may include, but not limited to, the non-volatile memory 116 of the management controller 110 or the non-volatile memory 176 of the RAID controller 170 as described above, or any other storage media of the management controller 110.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a computing device comprising a basic input/output system (BIOS);
a management controller connected to the computing device;
a redundant array of independent disks (RAID), comprising a RAID controller connected to the management controller and the computing device; and
a control circuit connected to the BIOS and the management controller,
wherein the BIOS is configured to, when the computing device is powered up and the BIOS completes power-on self-test (POST), send a POST code to the control circuit;
the control circuit is configured to, in response to receiving the POST code from the BIOS, attribute a first value to the management controller; and the management controller is configured to, in response to receiving the first value, construct a communication with the RAID controller for communicating with the RAID.

2. The system of claim 1, wherein the management controller is a baseboard management controller (BMC).

3. The system of claim 1, wherein the control circuit is a complex programmable logic device (CPLD).

4. The system of claim 1, wherein the management controller is connected to the control circuit via a general purpose input/output (GPIO) line, and the control circuit is configured to attribute the first value to the management controller through the GPIO line.

5. The system of claim 4, wherein the management controller comprises an input pin connected to the GPIO line, and the first value is a high voltage value.

6. The system of claim 4, wherein
the control circuit is further configured to, when detecting a power off of the computing device, attribute a second value to the management controller; and
the management controller is further configured to, in response to receiving the second value, disconnect with the RAID controller.

7. The system of claim 6, wherein the second value is a low voltage value.

8. A system, comprising:
a management controller;
a redundant array of independent disks (RAID), comprising a RAID controller connected to the management controller; and
a serial bus connected to the management controller and the RAID controller,
wherein the RAID controller is configured to, when the RAID is powered up, assert an alert signal to the serial bus;
the serial bus is configured to, in response to the alert signal, send an interrupt to the management controller; and
the management controller is configured to, in response to receiving the interrupt, construct a communication with the RAID controller for communicating with the RAID.

9. The system of claim 8, wherein the management controller is a baseboard management controller (BMC).

10. The system of claim 8, wherein the serial bus is a system management bus (SMBus).

11. The system of claim 8, further comprising a computing device connected with the management controller, the RAID controller and the serial bus.

12. The system of claim 8, wherein
the RAID controller is further configured to, when being turned off, send a disconnect message to the management controller; and
the management controller is configured to, in response to receiving the disconnect message, disconnect with the RAID controller.

13. The system of claim 12, wherein the management controller is further configured to, after being disconnected from the RAID controller, wait for another interrupt from the serial bus.

14. A system, comprising:
a management controller;
a redundant array of independent disks (RAID), comprising a RAID controller connected to the management controller, wherein the RAID controller comprises a special pin; and
a serial bus connected to the management controller and the special pin of the RAID controller,
wherein the RAID controller is configured to, when the RAID is powered up, assert the special pin with a ready signal; and
the management controller is configured to, in response to checking the ready signal from the special pin of the RAID controller via the serial bus, construct a communication with the RAID controller for communicating with the RAID.

15. The system of claim 14, wherein the management controller is a baseboard management controller (BMC).

16. The system of claim 14, wherein the management controller is configured to check the ready signal from the special pin of the RAID controller via the serial bus when the management controller attempts to communicate with the RAID controller.

17. The system of claim 14, wherein the serial bus is an inter-integrated circuit (I2C) bus.

18. The system of claim 14, wherein the special pin is a RAID_Ready pin, and the RAID controller asserts the ready signal by providing a high voltage value to the special pin.

19. The system of claim 14, wherein
the RAID controller is further configured to withdraw the ready signal from the serial bus; and
the management controller is configured to, in response to checking a withdrawn of the ready signal of the serial bus, disconnect with the RAID controller.

20. The system of claim 19, wherein the management controller is further configured to, after being disconnected from the RAID controller, check the serial bus for the ready signal.

* * * * *